United States Patent
Wang et al.

(10) Patent No.: US 8,996,609 B2
(45) Date of Patent: Mar. 31, 2015

(54) JOINING OF MACHINES IN A CONNECTED INSTANCE GROUP OF A NETWORKED COMPUTING ENVIRONMENT

(75) Inventors: Michael Wang, Neutral Bay (AU); Ken Leung, Mountain View, CA (US)

(73) Assignee: TIBCO Software Inc., Palo Alto, CA (US)

( * ) Notice: Subject to any disclaimer, the term of this patent is extended or adjusted under 35 U.S.C. 154(b) by 645 days.

(21) Appl. No.: 12/840,205

(22) Filed: Jul. 20, 2010

(65) Prior Publication Data

US 2011/0145328 A1  Jun. 16, 2011

Related U.S. Application Data

(60) Provisional application No. 61/227,036, filed on Jul. 20, 2009.

(51) Int. Cl.
| | |
|---|---|
| G06F 13/00 | (2006.01) |
| H04L 29/08 | (2006.01) |
| H04L 29/14 | (2006.01) |
| H04L 29/12 | (2006.01) |

(52) U.S. Cl.
CPC ......... *H04L 67/104* (2013.01); *H04L 29/12216* (2013.01); *H04L 61/2007* (2013.01); *H04L 67/1048* (2013.01); *H04L 67/1093* (2013.01); *H04L 67/1046* (2013.01); *H04L 69/40* (2013.01)
USPC ......................................................... 709/203

(58) Field of Classification Search
CPC ................... H04L 29/08072; H04L 29/06027; H04L 12/581; H04L 29/06; H04L 29/12216; H04L 61/2007; H04L 67/104; H04L 67/1046; H04L 67/1048; H04L 67/1093; H04L 69/40; G06Q 10/10
USPC ................. 370/254; 709/222, 203, 204
See application file for complete search history.

(56) References Cited

U.S. PATENT DOCUMENTS

| | | |
|---|---|---|
| 2003/0120680 A1 | 6/2003 | Agrawal et al. |
| 2008/0151778 A1 * | 6/2008 | Venkitaraman et al. ...... 370/254 |

FOREIGN PATENT DOCUMENTS

| | | |
|---|---|---|
| CN | 101035192 A | 9/2007 |
| CN | 101180859 A | 5/2008 |
| WO | 2006127370 A2 | 11/2006 |

OTHER PUBLICATIONS

PCT/US2010/042661, International Search Report and Written Opinion of the International Searching Authority dated Feb. 25, 2011.
Traversat et a l . "Project JXTA 2.0 super-peer virtual network", Sun Micro Systems Inc. Technical Report, 2003.
Milojicic et a l . "Peer-to-peer computing", HP Laboratories Palo Alto, Technical Report HPL-2002-57 (R. 1) Jul. 3, 2003.
Halepovic et al. "Building a P2P forum system with JXTA", IEEE Peer-to-Peer Computing, Sep. 5, 2002.
Office action from Chinese patent application 201080041480.6 mailed Jan. 6, 2014.

\* cited by examiner

*Primary Examiner* — Robert B Harrell
(74) *Attorney, Agent, or Firm* — Baker & McKenzie LLP

(57) ABSTRACT

A system for building and maintaining a connected instance group of machines includes protocols for instance group creation; master machine creation, operation, and recovery; and peer machine creation, operation, and recovery. These protocols allow each machine to connect with a data source and to build a local hosts file containing the name and IP addresses of the machines in the instance group and, thus, provides network connectivity among the machines in the instance group.

9 Claims, 7 Drawing Sheets

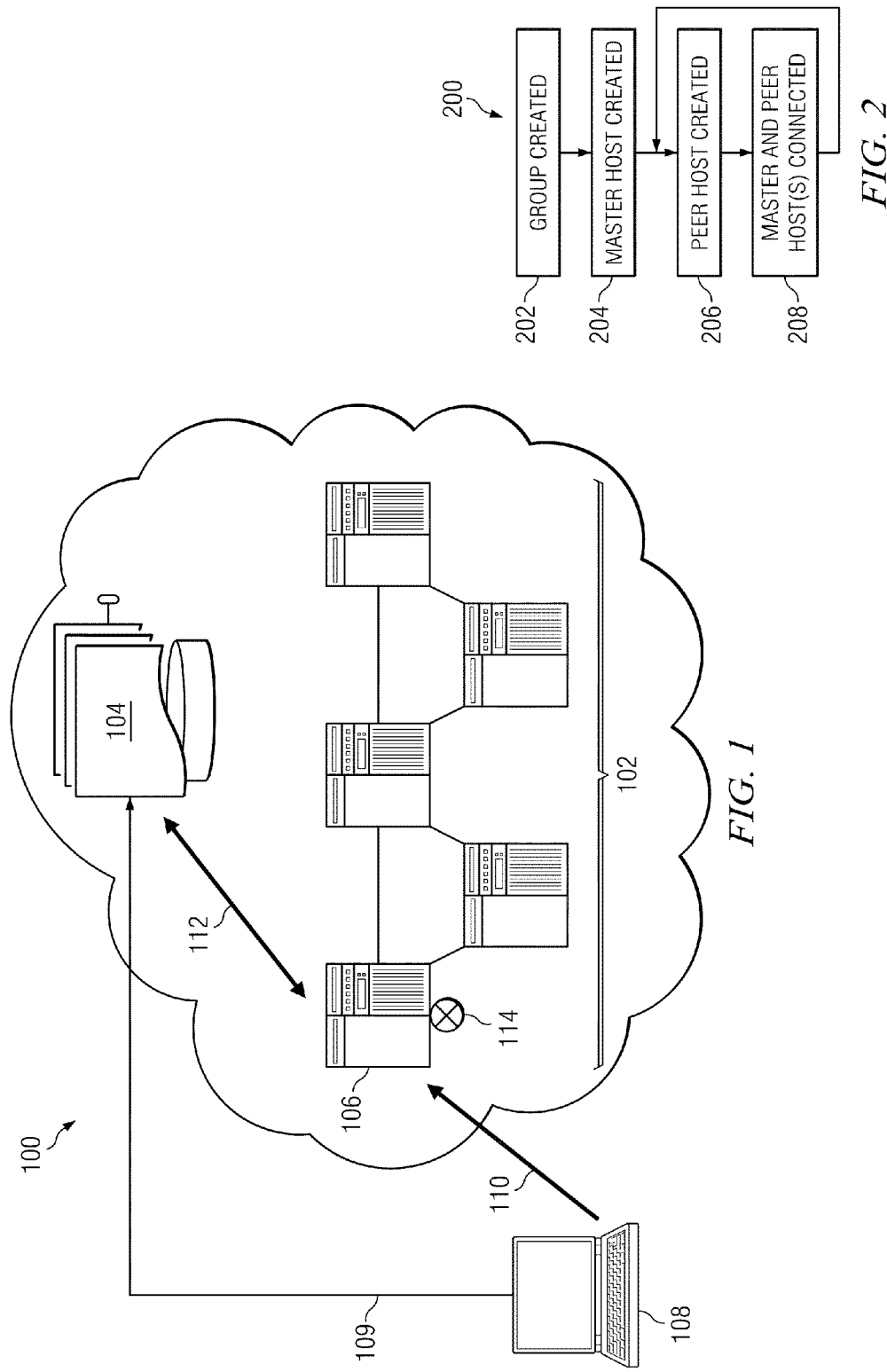

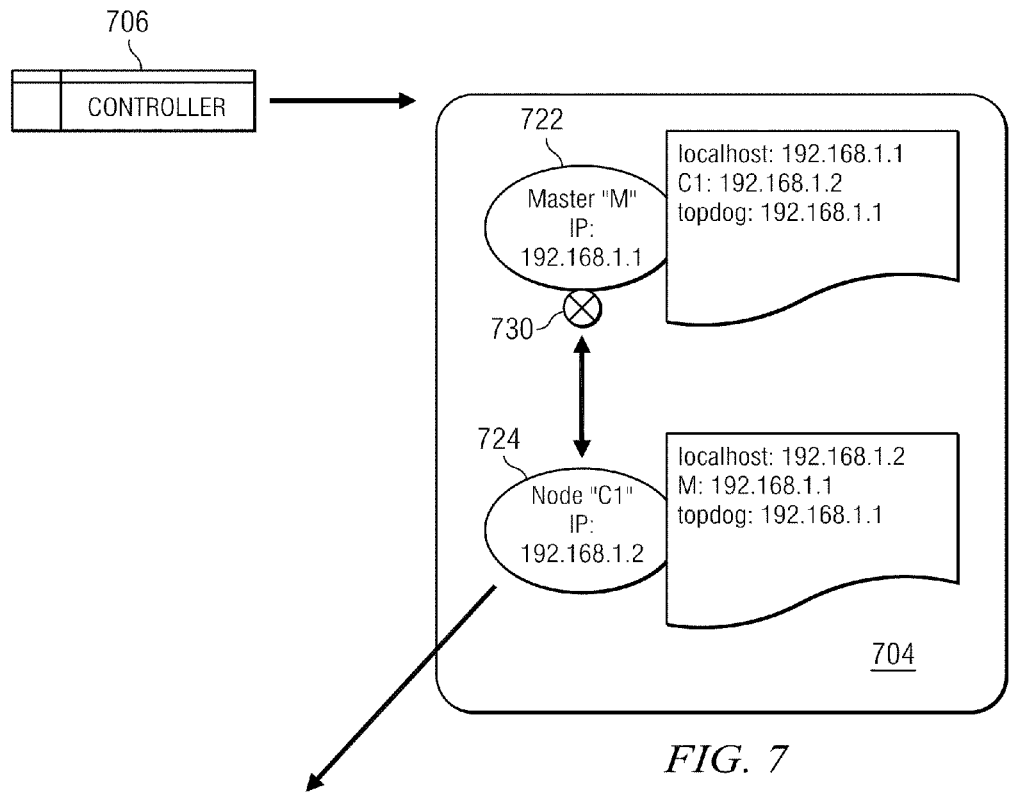
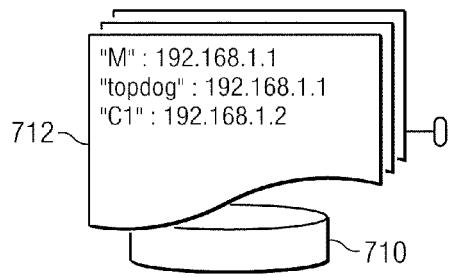
*FIG. 7*
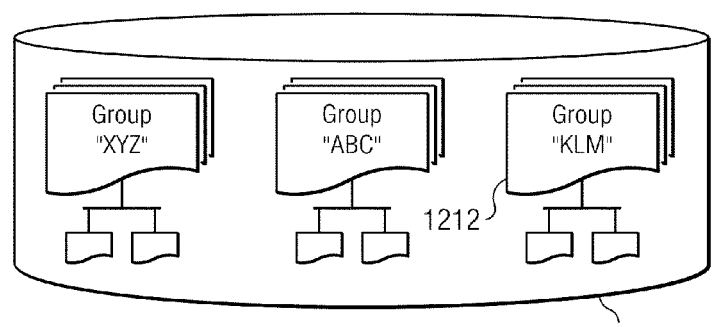
*FIG. 12*

JOINING OF MACHINES IN A CONNECTED INSTANCE GROUP OF A NETWORKED COMPUTING ENVIRONMENT

CROSS REFERENCE TO RELATED APPLICATIONS

This application relates and claims priority to U.S. Prov. Pat. App. No. 61/227,036 entitled, "Connected instance group of dynamically addressed hosts in a non-multicast environment," filed Jul. 20, 2009, which is herein incorporated by reference.

BACKGROUND

Domain Name System (DNS) is a hierarchical naming system for computers, services, or any resource connected to the internet or a private network providing mapping between IP addresses and host names. DNS provides a convenient way that, given a host name, an IP address will be returned. DNS does not have a concept of logical grouping and, thus, a user is not able to query DNS and ask for a group. Also, with DNS, when a user wishes to communicate with a particular machine they first must look up the machine's IP address with DNS. A user may recite a URL or a host without knowing the IP address and without having to know how a machine will locate the site. Thus, every time a user wishes to view a URL or send an e-mail, the machine's IP address is looked up in the DNS.

Peer-to-peer (P2P) networks are distributed networks composed of participants making a portion of their resources available to other network participants, without the need for central coordination instances. If a user is requesting a resource from one of the instances, then the other instances may become aware of that instance. But P2P does not create a full connectivity of instances, so not all instances are aware of each other in a P2P network.

In a class of networks in which machines do not have permanent static IP address, such that IP addresses come and go, (e.g., cloud computing networks) and in which broadcast is not enabled, there remains a need for applications to implement the notion of a cluster or group of logically related instances having the ability to connect to each other consistently. There remains a need for instances in a group to all have awareness of each other.

BRIEF SUMMARY

Disclosed are machines in a connected instance group in a networked computing environment, methods for machines to be connected with a connected instance group in a networked computing environment, and methods for recovering the connected instance group in the event of machine failure.

Generally, according to an aspect, a method for a machine joining an instance group in a networked computing environment includes determining the IP address of the machine, communicating group name information associated with the instance group and the IP address to a data source, receiving IP addresses for other machines associated with the instance group from the data source, and connecting to the instance group. The machine may connect to a messaging service associated with the instance group, and the messaging service may be either a messaging service client or a messaging service server, depending on whether the machine is the first machine to join the instance group.

Generally, according to another aspect, if a master machine in the instance group fails, a method for reconnecting with a restarted master machine in the connected instance group includes determining a lack of connectivity between a peer machine and a failed master machine, periodically attempting to connect to a messaging service server associated with the failed master machine, and, after the failed master machine is restarted, connecting to a messaging service server associated with the restarted master machine.

Generally, according to another aspect, a machine of an instance group in a networked computing environment may include a processor element, a memory element, a communication element, and a messaging service element. The processor element may be operable to determine an IP address of the machine. The memory element may be operable to store a local hosts file associated with the machine. The communication element may be operable to communicate, through a communication bus, to a data source associated with the networked computing environment, group name information associated with the instance group and the IP address, and to receive, through the communication bus, from the data source, IP addresses for the other machines associated with the instance group. The messaging service element may be operable to connect with the instance group.

BRIEF DESCRIPTION OF THE DRAWINGS

Embodiments are illustrated by way of example in the accompanying figures, in which:

FIG. 1 is a schematic diagram illustrating a networked computing system, in accordance with the present disclosure;

FIG. 2 is a flow diagram illustrating creating a connected instance group, in accordance with the present disclosure;

FIG. 7 is a schematic diagram illustrating a peer machine joining an instance group, in accordance with the present disclosure;

FIG. 12 is a schematic diagram illustrating a data source, in accordance with the present disclosure.

DETAILED DESCRIPTION

Figure 3:
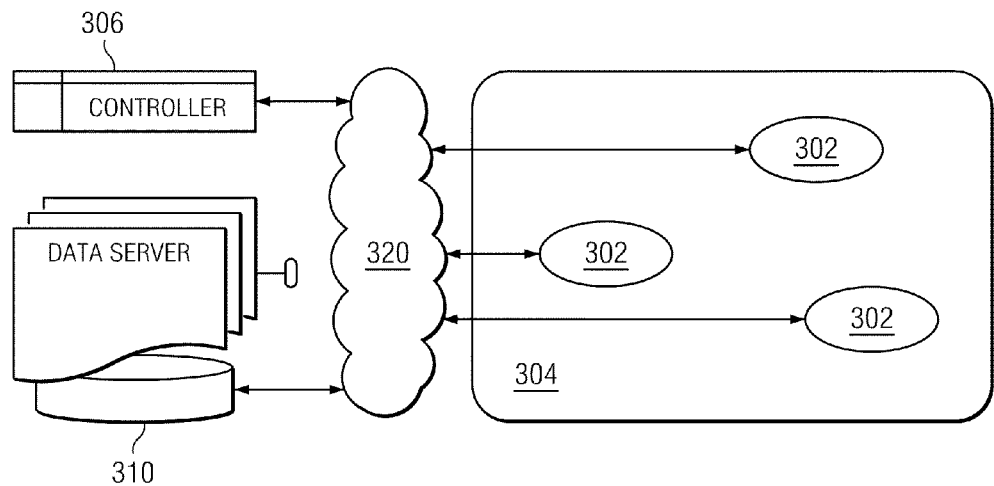
FIG. 3 is a schematic diagram illustrating a system for instance group connectivity, in accordance with the present disclosure.

This disclosure relates to a technique for building and maintaining a connected instance group of machines whose IP address are assigned dynamically at the time of their instantiation. As referred to herein, a connected instance group is a group of machines in a networked computing environment in which each machine holds the IP address of every other machine in the group. Thus, the machines may connect and communicate with each other (e.g., via TCP).

FIG. 1 is a schematic diagram of a networked computing system 100. The networked computing system 100 includes a collection of machines 102. In an embodiment, the networked computing system 100 is a cloud computing environment with a collection of machines 102.

A user/controller 108 may initiate the creation of an instance group in the networked computing system 100 by creating an instance group at a data source 104 associated with the networked computing system 100 at action 109. The user/controller 108 creates a first instance at action 110. In an embodiment, the first instance is the master instance. When the master instance 106 is booted up, it attaches to the network 102 and the underlying operating system will give it an IP address. A set of software is run as part of the operating system boot up, and this set of software will connect the master instance 106 to the data source 104 and announce its IP address at action 112. The master machine 106 may receive information from the data source 104 about other machines in the instance group, if there are any. The master machine 106 also starts a messaging service server 114, that can provide publish and subscribe information, and listens for peer machine connections. The messaging service server 114 may provide notification to the master 106 of instances joining the instance group. As discussed in further detail below, peer machines join the group in a similar manner, but a messaging service client is used at the peer machines.

FIG. 2 is a high-level flow diagram illustrating instance group creation 200. An instance group is created by a controller/user at action 202. A master machine or host is created at action 204. A peer machine is started at action 206. The master and peer machines are connected at action 208. The peer machine being created at action 206 may be repeated for other peer machines joining the instance group. After each peer machine joins the instance group, the master and peer machines are connected via the processes disclosed in this disclosure.

Prior to joining the instance group, the machines may not have a priori knowledge of other machines in the instance group with which they could query a central server for IP addresses. Managing the connectivity of a dynamic group of machines that has no predefined membership uses a communication protocol that can add, subtract, and reintroduce failed (or stopped) machines on the fly.

Thus, in an embodiment, machines are given dynamic IP addresses defined at the time of instantiation and are without a priori knowledge of their own IP address, the IP address of the other machines in the group (or yet to be added to the group), and the revised IP address of failed or stopped machines that are re-instantiated. In another embodiment, neither broadcast nor multicast network communication is enabled and, thus, is unavailable to implement a discovery protocol.

This disclosure relates to protocols for building and maintaining a connected instance group. The disclosure includes protocols for instance group creation (e.g., action 202); master machine creation (e.g., action 204), operation, and recovery; and peer machine creation (e.g., action 206), operation, and recovery. These protocols allow each machine to build a local machine host identity file, such as the /etc/hosts file on Unix/Linux systems, containing the name and IP address of the other machines in the group, and thus provides network connectivity among the machines in the instance group (e.g., action 208).

FIG. 3 is a schematic diagram illustrating a system for instance group connectivity. A small set of software is installed on each machine 302 in a group 304. This set of software is run as part of the operating system boot up. For example, a message service server/client is part of this software set. The message service/client is a messaging technology which implements the notion of publish and subscribe (e.g., Java Messaging Service, JMS). The message service server is the server portion of the messaging service and the message service client is the client portion of the service. A small set of parameters are also passed onto each machine 302 as part of the start up command from a controller 306. For example, the name of the group 304 that the machine 302 belongs to is passed as a string parameter and the location of the data source 310 is also passed along.

The instance group 304 may be thought of as a logical container of machines. A machine 302 typically has a functioning operating system, such as Linux or Microsoft Windows and is connected to a network. A controller 306 is an external application controlling the lifecycle (e.g., starting the machine, stopping the machine, etc.) of a machine 302. The controller 306 may be an external event generator, such as a graphical user interface (GUI). The data source 310 may be a well-known service with a fixed address and persistent storage. The described elements are in communication through the Internet or another communicating network 320.

Instance Group Creation

In an embodiment, a user may create a new instance group 304 by creating a table within a database at a data service 310 (e.g., Amazon's SimpleDB). The data source 310 should have a well-known access point or address (e.g., http://sdb.amazonaws.com) which can persist information. The database and table have a name unique to the instance group 304.

Figure 4:
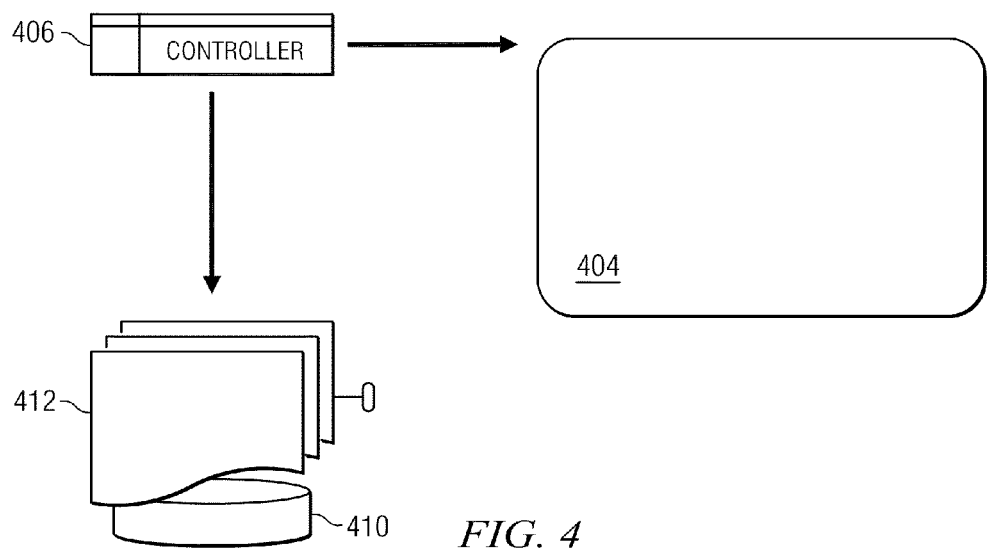
FIG. 4 is a schematic diagram illustrating creating a group, in accordance with the present disclosure.

FIG. 4 is a schematic diagram illustrating creating a group. Through the controller 406, an instance group 412 is initiated at the data server 410. The controller 406 may communicate with the data server via HTTP protocol. In an embodiment, the controller 406 invokes a web service using HTTP protocol to create the instance group 412. In doing so, a logical boundary or container, instance group 404, is created and instances belonging to the instance group 404 may be thought of as being inside this logical boundary. The instance group 412 is tangible data created at the data server 410. The instance group 404 defines a logical boundary for instances that will belong to the group 404.

In creating the instance group 412 at the data source 410, a database table is created in a database of data source 410. The instances being created or deleted may be tracked in the table in the database. After joining the group 404, 412, each machine may retain a substantially complete map of the machines in the instance group 404, 412.

Master Machine Creation and Connection

Figure 5:
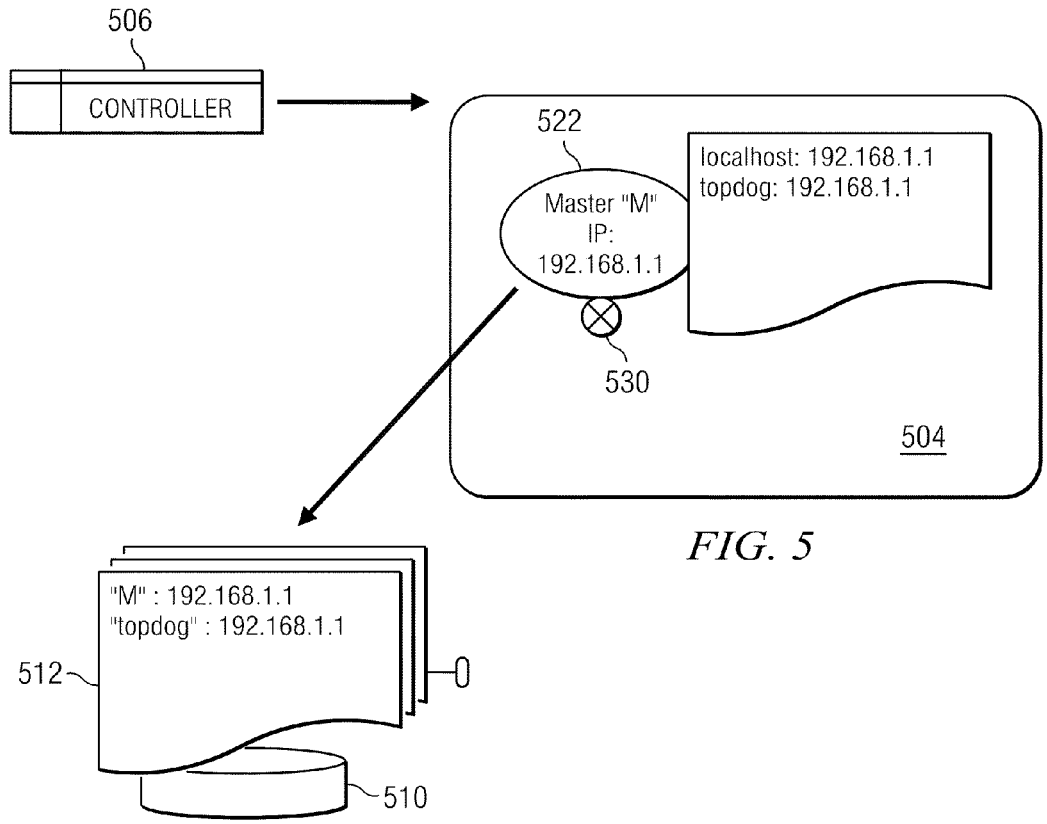
FIG. 5 is a schematic diagram illustrating a master machine joining an instance group, in accordance with the present disclosure.

FIG. 5 is a schematic diagram illustrating a first machine 522 joining an instance group 504. The controller 506 creates a first machine 522. In an embodiment, the first machine is the master machine 522. A name is assigned to the master machine 522 (e.g., "M"). Since the name of the machine 522 is arbitrary, an alias may also be associated with the master machine 522 (e.g., "top dog"). Thus, accessing "M" is equivalent to accessing "top dog" and vice versa. When the master machine 522 is booted up, it attaches to the network and the underlying operating system will give it an IP address (e.g., 192.168.1.1).

A set of software is run as part of the operating system boot up and this set of software will connect the master machine 522 to the data source 510 and announce its IP address. More specifically, the master 522 connects to the data source 510 and tells the data source 510 its name (e.g., M), its alias (e.g., topdog), and its IP address (e.g., 192.168.1.1). This information may be stored in the data source 510 at the database table for the instance group 512.

The alias may be hard-coded into the master M 522. The master M 522 may through its local host file determine its alias and IP address. This alias may also be used by future joining machines to refer to the master. In an embodiment, the software writes two entries into the database table 512: one for the master instance 522 and one for the master instance's alias. The entries are essentially equivalent.

The data source 510 has knowledge of master 522 being at a particular IP address. The master 522 may also grab any other information contained within the data source 510 for its instance group 512. When a master 522 is created as the first machine in an instance group 504, the data server 510 will not yet contain information about other machines. The master 522 then updates any information received into its local host file (e.g., the /etc/hosts file on Linux).

The master 522 also starts a messaging service server 530 that can provide publish and subscribe information and listens for peer connections. The messaging service 530 may provide notification to the master 522 of instances joining the instance group 504. In an embodiment, the messaging service 530 is a java messaging service.

Figure 6:
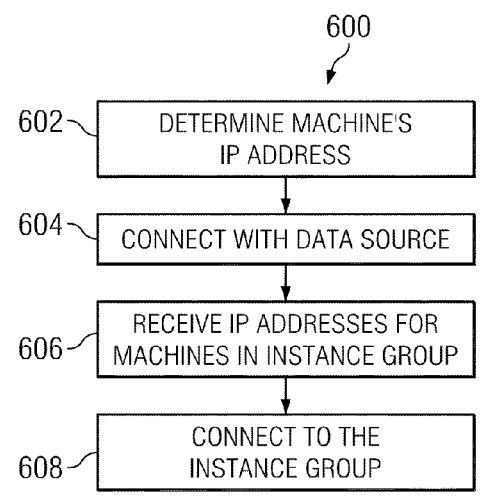
FIG. 6 is a flow diagram illustrating a joining machine finding other machines in an instance group, in accordance with the present disclosure.

FIG. 6 is a flow diagram 600 illustrating a machine connecting to an instance group. At action 602, the joining machine determines its own IP address after it is booted up. The machine connects with a data source at action 604 and announces its IP address, alias, and instance group name. The machine receives IP addresses for other machines in that instance group at action 606. The machine connects to the instance group at action 608.

Peer Machine Creation and Connection

FIG. 7 is a schematic diagram illustrating a peer machine 724 joining the instance group 704. The controller 706 initiates a peer machine 724 into the instance group 704 and assigns it a name (e.g., "C1"). The peer machine 724 will, similarly to the master machine 722, contact the data source 710 and update the instance group database table 712 with its IP address and other information. Also similar to the master machine 722, the peer machine 724 will read back the information stored in the instance group database table 712. The peer machine 724 may update its own local hosts file and, thus, is aware of the address of the master (e.g., by looking up "top dog" in the local hosts file).

The peer machine 724 also starts a messaging service client that can provide a connection to the master's message service server 730. Once connected, the peer machine 724 may announce itself to the master machine 722. In an embodiment, the peer machine 724 announces on a topic about its own existence and information through the message service 730. Since the master machine 722 is listening on this topic, the master machine 722 is notified of the peer machine 724 and may update its local hosts file with a new entry associated with the peer machine 724. The peer machine 724 is aware of the master machine 722 and the master machine 722 is aware of the peer machine 724.

Figure 8:
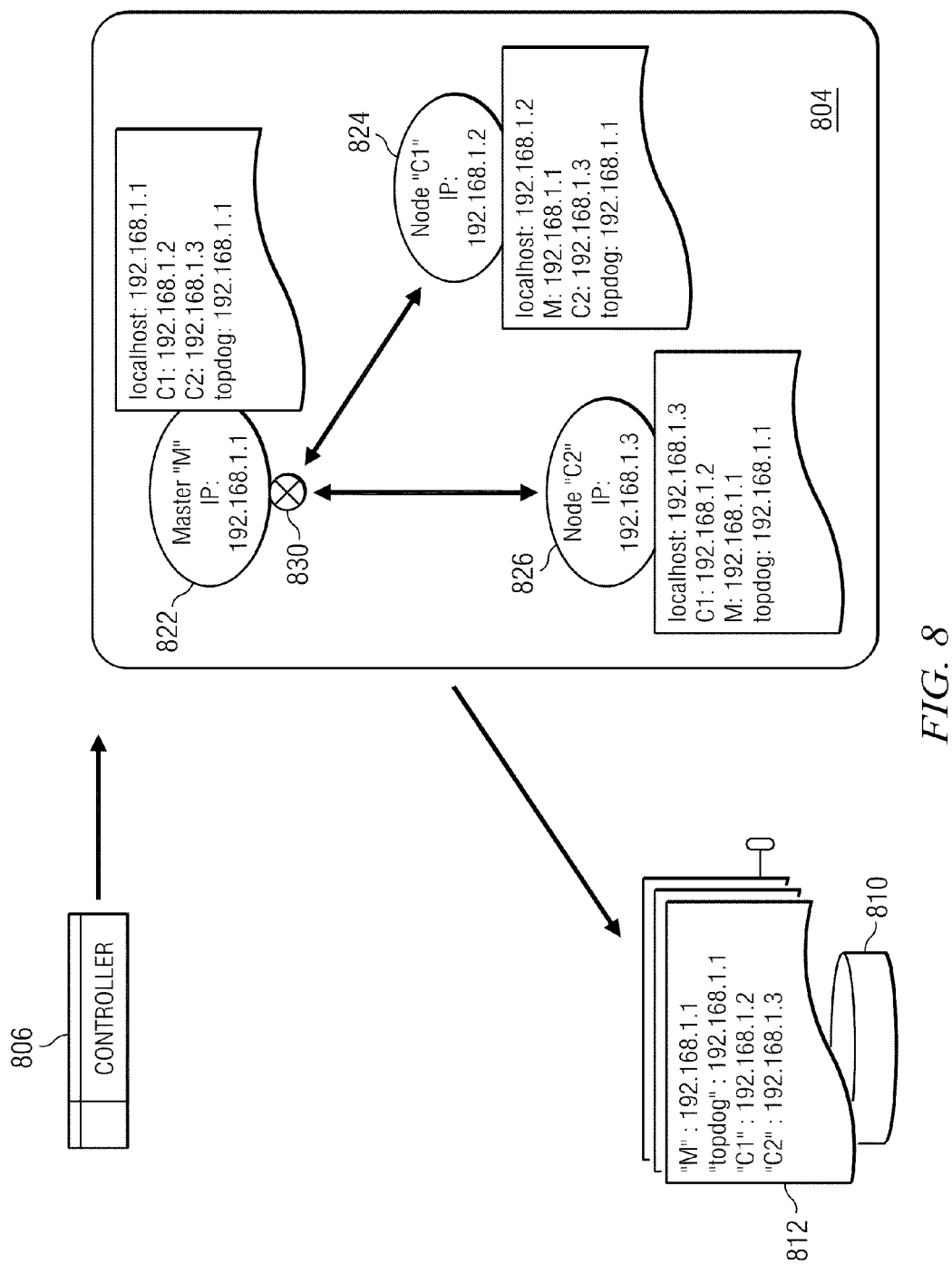
FIG. 8 is a schematic diagram illustrating another peer machine joining an instance group, in accordance with the present disclosure.

FIG. 8 is a schematic diagram of another peer machine 826 joining the instance group 804 containing master machine 822 and peer machine 824. Similar to the approach described in FIGS. 5 and 7, a controller may create a new peer machine 826 into instance group 804 and assign the new peer machine 826 with a name (e.g., "C2"). A controller 806 initiates the new peer machine 826 in the instance group 804.

Also similar to the approach of FIGS. 5 and 7, the new peer machine 826 contacts the data source 810 and updates the instance group object 812 with its IP address. Then the new peer machine 826 may read back all information in the instance group object 812 and update its local host file. The new peer machine 826 is aware of the master machine 822 and the other peer machine 824.

The new peer machine 826 is running the message service client and it connects to the message service server 830 at the master machine 822. Once connected, it will announce on a well-known topic about its own existence to the message service 830. Since the master machine 822 is listening on this topic, it will be notified about the new peer machine 826 and may update its local host file with a new entry. The master 822 and the new peer machine 826 are aware of each other. Also, since the other peer machine 824 is listening on this topic, it is notified about the new peer machine 826 and updates its local hosts file with a new entry. The new peer machine 826 and the other peer machine 824 are aware of each other. Thus, the master 822 and the two peers 824, 826 are aware of each other.

Any number of machines may be added to the instance group 804 in a similar manner, resulting in a connected instance group.

Machine Recovery

Figure 9:
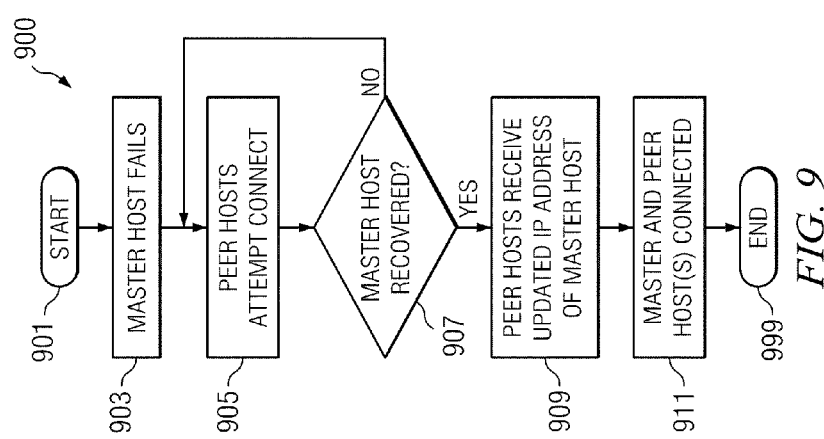
FIG. 9 is a flow diagram illustrating a master machine failure, in accordance with the present disclosure.

FIG. 9 is a flow diagram 900 illustrating master machine failure and recovery. The process begins at step 901. Master failure occurs at action 903. The peer machines attempt to communicate with the messaging service at the master machine at action 905, but are unable to do so because the master machine has failed. While the master machine has not been restarted (the "no" loop following action 907), the peer machines will continue to attempt to connect with the master machine at action 905. In doing so, the peer machines are unable to connect with the messaging service and connect with the data source to obtain the master machine's IP address. When the master machine has not yet recovered, the data source holds the failed master machine's IP address and will continue to provide that IP address to the requesting peer machines. Thus, the peer machines are still unable to connect with the master machine and will continue to connect with the data source to obtain the master machine's IP address. Once the master machine recovers (the "yes" path following action 907), the data source is updated with master machine's new IP address (as discussed above in the approach of FIGS. 5 and 6) and the peer machines receive the new IP address for the master machine when they request it from the data source at action 909. The master and peer machines are again connected as a connected instance group at action 911 and the process ends at step 999. The process is discussed in greater detail below.

Figure 10:
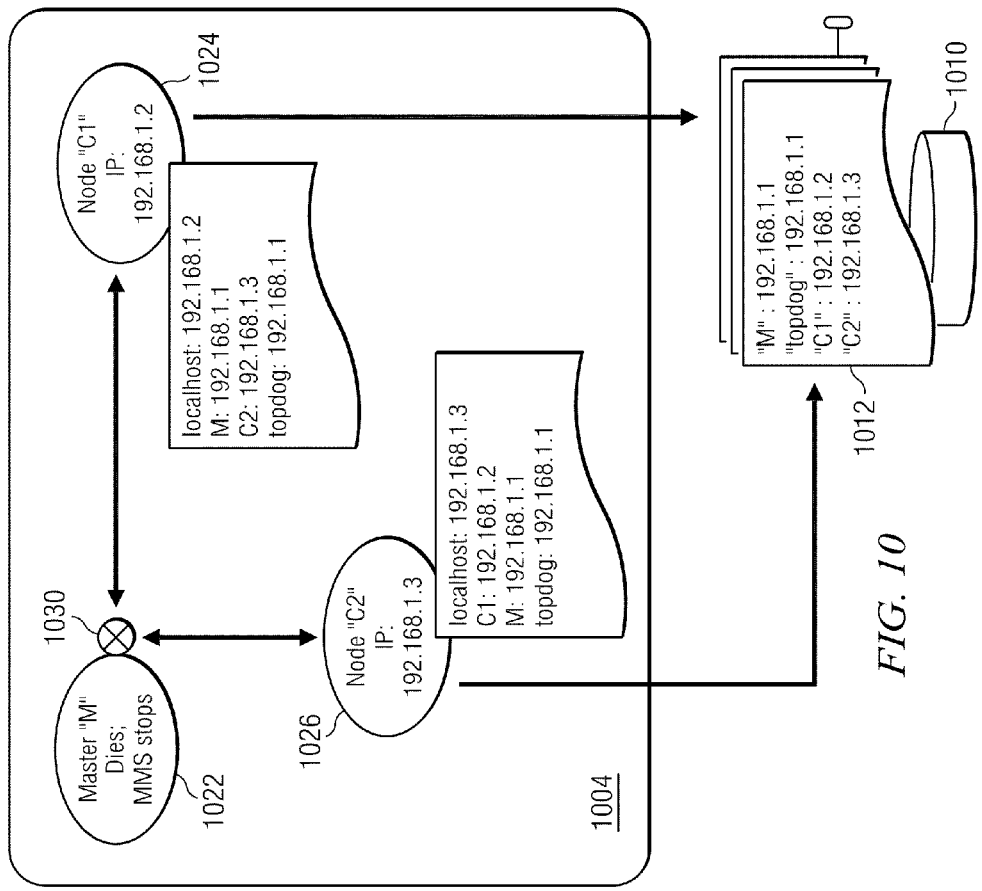
FIG. 10 is a schematic diagram illustrating a master machine failure, in accordance with the present disclosure.

FIG. 10 is a schematic diagram illustrating a master machine 1022 failure. If the master machine 1022 fails or disappears from the network, since the master machine 1022 was hosting the message service server 1030, the peer machines 1024, 1026 will lose connection to the master machine 1022. The peer machines 1024, 1026 will periodically attempt to reconnect to the message service server 1030. In an embodiment, the peer machines 1024, 1026 will contact the data source 1010 and read back the current value of the instance group object 1012. At this point, the instance group object 1012 still holds the previous IP address value for the master machine 1022, so the peer machines' attempts to reconnect will continue to fail. The peer machines 1024, 1026 will continue trying to reconnect.

Figure 11:
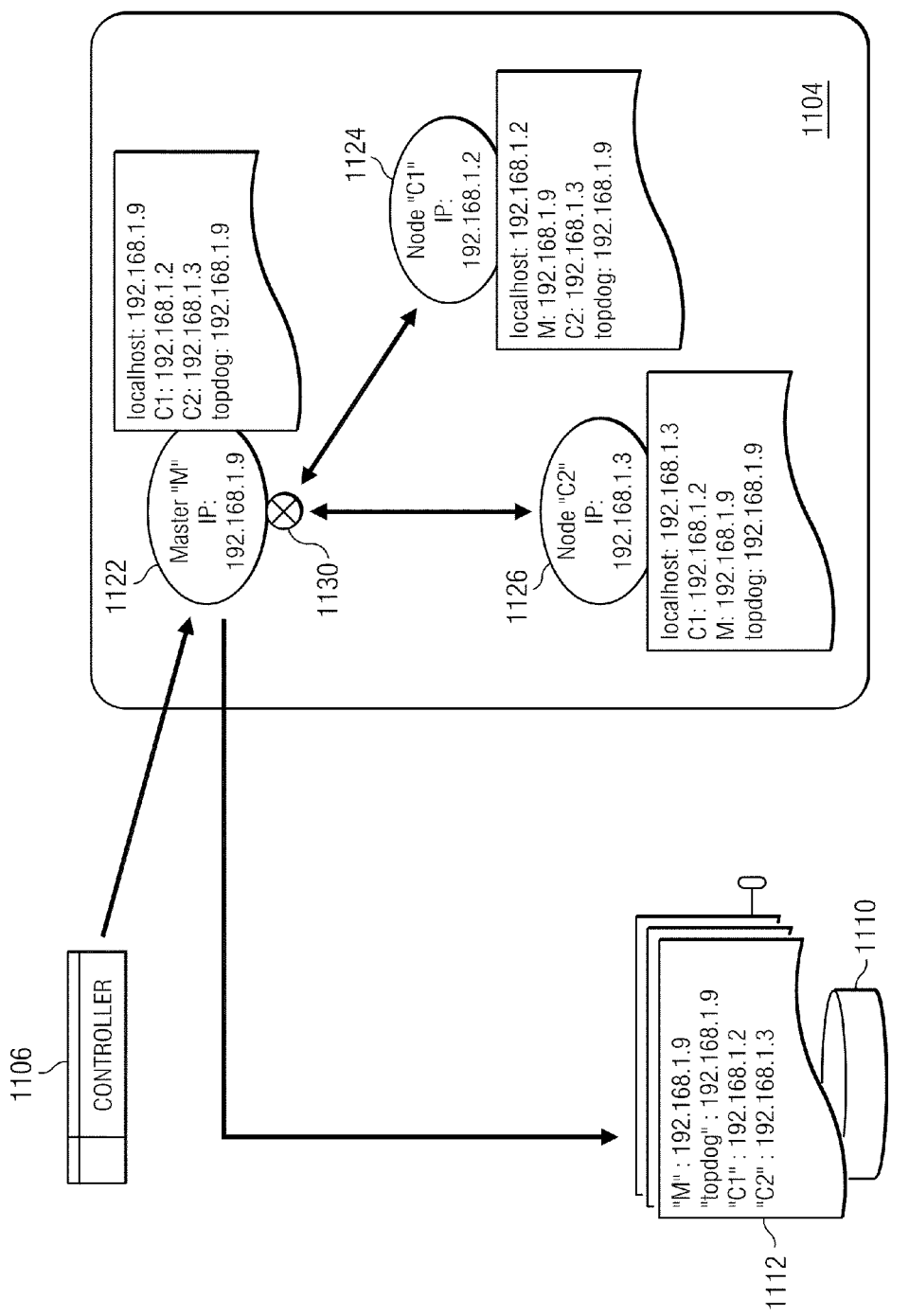
FIG. 11 is a schematic diagram illustrating a master machine recovery, in accordance with the present disclosure.

FIG. 11 is a schematic diagram illustrating a master machine 1122 recovery in the instance group 1104. A controller may initiate the restart of the master machine 1122. In an embodiment, the master machine 1122 is reinitialized automatically. Upon restart, a new IP address may be assigned to the master machine 1122 (e.g., 192.168.1.9). The master machine 1122 will contact the data server 1110 and update the instance group object 1112 with its new IP address. The master machine 1122 will read back the information stored in the instance group object 1112 and update its local hosts file.

As part of a reconnect attempt, the peer machines 1124, 1126 will contact the data source 1110 and read back the content of the instance group object 1112. The instance group object 1112 holds the new IP address for the master machine 1122 and, thus, the peer machines 1124, 1126 will read new values for the master machine 1122. With the new value for the master machine 1122, the peer machines 1124, 1126 may connect with the message service server 1130. The master machine 1122 and the peer machines 1124, 1126 are aware of each other.

If a peer machine dies, the start up is similar to the start up procedure described in relation to FIGS. 7 and 8.

FIG. 12 is a schematic diagram illustrating a set of instance group definitions 1212 stored on a data source 1210. The data source 1210 stores information as a set of instance group definitions 1212, each being a unique namespace. Within each instance group 1212, a set of named value pairs are stored.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

For example, as referred to herein, a machine may be a virtual machine, computer, node, instance, host, or machine in a networked computing environment. Also as referred to herein, a networked computing environment is a collection of machines connected by communication channels that facilitate communications between machines and allow for machines to share resources. Also as referred to herein, a server is a machine deployed to execute a program operating as a socket listener and may include software instances.

Resources may encompass any types of resources for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof.

A networked computing environment may include, but is not limited to, computing grid systems, distributed computing environments, cloud computing environment, etc. Such networked computing environments include hardware and software infrastructures configured to form a virtual organization comprised of multiple resources which may be in geographically disperse locations.

While HTTP communication protocols may be described herein, the coverage of the present application and any patents issuing there from may extend to other local-area network, wide-area network, or other network operating using other communications protocols.

Services and applications are described in this application using those alternative terms. Services can be java services or other instances of operating code. A service/application is a program running on a machine or a cluster of machines in a networked computing environment. Services may be transportable and may be run on multiple machines and/or migrated from one machine to another.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A method for a machine joining an instance group in a networked computing environment to connect with other machines associated with the instance group, the method comprising:

determining, by the machine joining the instance group, an IP address of the machine;

communicating, by the machine joining the instance group, with a data source external to the instance group and associated with the networked computing environment, group name information associated with the instance group and the IP address, wherein the data source stores information for a plurality of instance groups, the plurality of instance groups including the instance group;

receiving, by the machine joining the instance group, from the data source, IP addresses for a master machine and the other machines associated with the instance group, the master machine operable to provide a messaging service for the instance group via a message service server;

connecting, by the machine joining the instance group, to the instance group;

launching, by the machine joining the instance group, a message service client and connecting the message service client to the message service server at the master machine; and announcing, by the machine joining the instance group to the master machine and the other machines, via the connection between the message service client and the master service server, the joining of the machine to the instance group.

2. The method of claim 1, wherein the announcing the joining of the machine to the instance group comprises announcing the IP address and a name associated with the machine joining the instance group.

3. The method of claim 1, further comprising:
if the instance group is empty, naming the machine a name associated with a master host.

4. The method of claim 1, further comprising listening for peer machines joining the instance group.

5. The method of claim 1, further comprising:
at a regular time period, pinging the data source for IP addresses for the other machines associated with the instance group.

6. The method of claim 1, further comprising creating the instance group at the data source.

7. The method of claim 1, further comprising:
if the instance group already has a master host, naming the machine a name associated with a peer machine.

8. The method of claim 1, further comprising writing, to a local host file, the IP addresses for the other machines associated with the instance group.

9. The method of claim 1, further comprising writing, to a local host file, the IP address of the machine.

* * * * *